Figure 1:
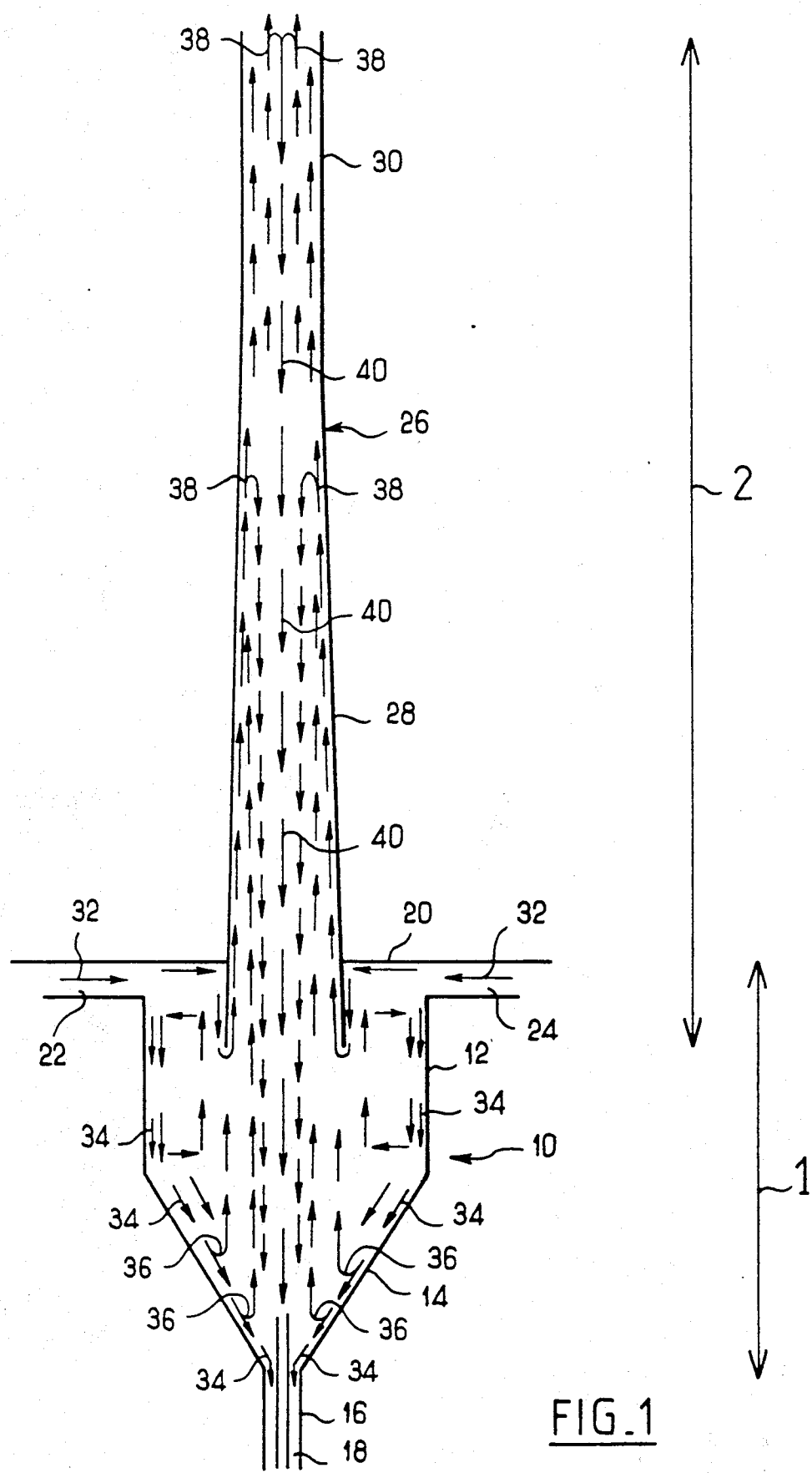

United States Patent [19]

Seureau et al.

[11] Patent Number: 5,332,500
[45] Date of Patent: Jul. 26, 1994

[54] THREE-PHASE CYCLONE SEPARATOR

[75] Inventors: Jacques Seureau, Aulon; Bu-Feng Ma, Toulouse; Yves Aurelle, Aucamville; Dimitre Hadjiev, Toulouse, all of France

[73] Assignee: Elf Aquitaine Production, France

[21] Appl. No.: 45,116

[22] Filed: Apr. 12, 1993

[30] Foreign Application Priority Data

Apr. 14, 1992 [FR] France .................. 92 04608

[51] Int. Cl.5 .................... B04C 7/00; B01D 21/26
[52] U.S. Cl. ..................... 210/512.1; 210/788; 209/132; 55/459.1
[58] Field of Search ................ 210/512.1, 788; 209/144, 211; 55/459.1

[56] References Cited

U.S. PATENT DOCUMENTS

| 2,717,695 | 9/1955 | Martin | 209/211 |
|---|---|---|---|
| 2,816,490 | 12/1957 | Boadway et al. | 92/28 |
| 4,581,142 | 4/1986 | Fladby et al. | 210/512.1 |
| 4,749,490 | 6/1988 | Smyth et al. | 210/512.1 |
| 4,810,382 | 3/1989 | Colman et al. | 210/512.1 |
| 4,820,414 | 4/1989 | Carroll et al. | 210/512.1 |
| 5,108,608 | 4/1992 | Carroll | 210/512.1 |

FOREIGN PATENT DOCUMENTS

| 4364968 | 3/1970 | Australia . |
| 2224458 | 8/1973 | Fed. Rep. of Germany . |

Primary Examiner—Robert A. Dawson
Assistant Examiner—David Reifsnyder
Attorney, Agent, or Firm—Bacon & Thomas

[57] ABSTRACT

Three-phase cyclone separator comprising a body (10) formed by a cylindrical part (12) extended at one of its ends by converging, substantially conical a part (14), at least one intake (22; 24) mounted tangentially on the cylindrical part (12) and a substantially tubular element (26) mounted on the body (10) and communicating hydraulically with the latter.

According to the invention, the substantially tubular element (26) is mounted on the cylindrical element (12), at an end opposite the substantially conical part (14), and the substantially conical part (14) is fitted, towards its apex, with two outlets (16, 18).

4 Claims, 2 Drawing Sheets

THREE-PHASE CYCLONE SEPARATOR

The present invention relates to a three-phase cyclone separator.

Separators, more commonly called "hydrocyclones", are generally intended for separating two immiscible phases with different densities. In this type of separator, the mixture of the two phases is injected at high speed into a chamber which is generally cylindrical so that the mixture moves inside the chamber in a gyratory movement. The different densities of the two phases cause migration of the denser phase towards the wall of the chamber, under the effect of the centrifugal force generated by the gyratory movement, the lighter phase remaining towards the inside of the chamber. By arranging two outlets for the phases, one towards the wall of the chamber and the other along the axis of the chamber, the two phase may be separated. This operating principle may be used in order to separate an oil/water emulsion into its two components. Document U.S. Pat. No. 4,749,490 describes a separator of the hydrocyclone type comprising a body formed by a cylindrical part fitted with a tangential intake and an axial outlet, and connected to a tubular element of low conicity by a conical part. An oil/water emulsion injected through the tangential intake follows a gyratory path inside the cylindrical part. The oil, having a density less than that of water, migrates towards the inside of the body and leaves through the axial outlet, whilst the water, which is denser, tends to go along the wall of the body towards the tubular element of low conicity. The water with the oil removed is evacuated through an outlet at the free end of the tubular element.

This type of hydrocyclone has the drawback of not being adapted for the separation of a three-phase emulsion.

In certain fields, for example when treating the waste water from an oil well, an oil/water emulsion is encountered which contains solid matter in suspension. This matter may for example be sand. A separator as described in document U.S. Pat. No. 4,749,490 makes it possible to separate the light liquid phase from the other two phases which remain mixed. The presence of sand in the water passing through the hydrocyclone causes erosion of the internal wall, which erosion may considerably reduce the efficiency of the separator.

The object of the present invention is to provide a cyclone separator which is adapted for separating a mixture of three phases which is formed by two fluids with different densities and a solid phase in suspension.

For this purpose, the invention provides a three-phase cyclone separator comprising a body formed by a cylindrical part extended at one of its ends by a converging, substantially conical part, at least one intake mounted tangentially on the cylindrical part and a substantially tubular element mounted on the body and communicating hydraulically with the latter, characterised in that the substantially tubular element is mounted on the cylindrical element, at an end opposite the substantially conical part, and in that the substantially conical part is fitted, towards its apex, with two outlets.

The hydrocyclone according to the invention makes it possible to separate, first, the solid phase in suspension, and, secondly, to separate the two fluids with different densities.

By removing the solid phase first, the erosion of the internal wall of the separator is reduced to a minimum.

Figure 2:
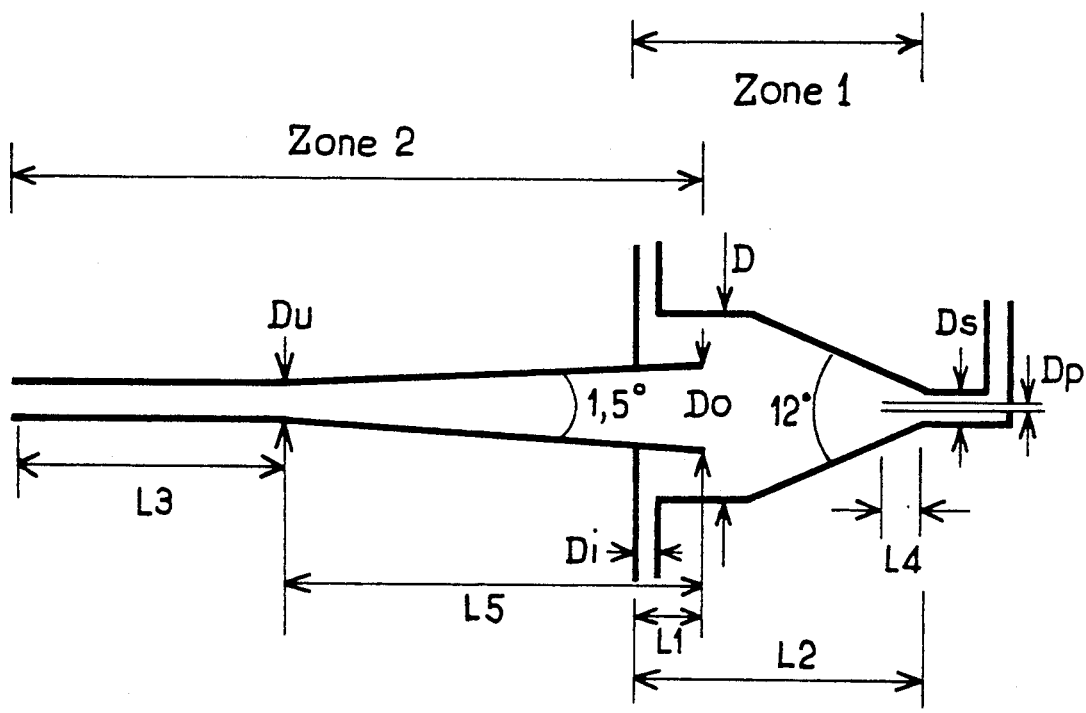

Other advantages and characteristics will emerge on reading the description, which is given by way of indication but without limitation, of a preferred embodiment of the invention, as well as from the attached drawings, in which:

FIG. 1 is a diagrammatic view in longitudinal section of a cyclone separator according to the present invention, and FIG. 2 is a view similar to that in FIG. 1 indicating the relative dimensions of the apparatus.

As represented in FIG. 1, a cyclone separator according to the invention comprises a body 10 formed by a cylindrical part 12 and a conical part 14. The conical part 14 is fitted, towards the apex of the cone, with a cylindrical endpiece 16 inside which a tubular outlet 18 is arranged, both being arranged coaxially with the cylindrical part 12.

The body 10 is closed by an annular element 20 which comprises two intakes 22 and 24, arranged tangentially with respect to the cylindrical part 12. The two intakes are mounted diametrically opposite on the annular element 20 and in opposite directions to each other. The annular element 20 receives, in a leaktight manner, a substantially tubular element 26 arranged coaxially with the body 10 and formed by a part 28 of low conicity and by a cylindrical extension 30.

The hydrocyclone thus described operates in the following manner.

An oil/water emulsion containing solid matter in suspension is sent under pressure into the body 10 through the two intakes 22 and 24. The speed of flow of the fluid is of the order of 8 to 10 m/s. Entering the body 10 tangentially in the direction of the arrows 32, the emulsion flows at high speed in a gyratory movement inside the cylindrical part 12. Under the effect of the centrifugal force thus generated, the solid matter in suspension migrates towards the walls of the cylindrical part 12 and of the conical part 14 and is evacuated through the endpiece 16, as indicated by the arrows 34.

The conical shape of the part 14 forces the oil/water emulsion, from which the solid matter has been removed, to change its longitudinal direction of flow as indicated by the arrows 36, and to pass into the tubular element 26 while continuing to flow in its gyratory movement. The two phases of the emulsion separate when the emulsion passes along the part 28 of low conicity and the cylindrical extension 30, the water being found towards the wall of the parts 28 and 30 and the oil being found at the inside. The far end of the cylindrical extension 30 comprises a constriction formed either by a partially closed valve or by a stationary constriction (these are not shown). A back pressure caused by this constriction is applied to the end of the cylindrical extension 30. This back pressure acts on the oil and makes it reverse its direction of flow as indicated by the arrows 38. A flow of oil is thus directed in a direction which is the reverse of the direction of flow of the oil/water emulsion, forming a line represented by the arrows 40. The oil separated from the water thus follows an axial path, in a direction which is the reverse of that of the flow of the emulsion, over the length of the hydrocyclone and leaves through the tubular outlet 18, the purified water leaving through the constriction at the opposite end of the hydrocyclone.

The hydrocyclone according to the invention thus comprises two separation zones, a first solid/liquid separation zone 1 and a second liquid/liquid separation zone 2. The small difference in density between the water and the oil has the result that, even with high tangential speeds, the length of the part 28 with low conicity must be large in order to ensure the separation of the two media.

The recovery of oil line 40 at the end opposite to the water outlet makes it possible not only to improve the efficiency of the hydrocyclone, but also makes it possible to avoid entraining solid matter in suspension towards the element 26, the axial flow of oil forces the solid matter to follow the path of the arrows 34. The part 28 with low conicity projects over a distance L1 inside the cylindrical part 12 of the body 10 (see FIG. 2). The presence of this projection inside the cylindrical part 12 prevents the emulsion entering through the intakes 22 and 24 from passing directly into the element 26 and thus forces it to follow a gyratory path inside the body 10. For the same reason, the outlet 18 extends inside the conical part 14 of the body 10 so that the solid matter is evacuated only through the endpiece 16, the line of oil passing through the tubular outlet 18.

The efficiency of the hydrocyclone according to the invention is a function of the ratios between the dimensions of the various elements forming the apparatus. These dimensions are indicated diagrammatically in FIG. 2.

The following ratios are given by way of example:

$$\frac{Do}{D} < 0.9 \quad \frac{L1}{D} > 0.05 \quad \frac{L2}{D} > 0.5 \quad \frac{Du}{Do} < 0.96$$

$$\frac{Ds}{D} > 0.01 \quad \frac{Dp}{D} > 0.005 \quad \frac{Du}{D} < 0.9 \quad \frac{L3}{D} > 1$$

$$\frac{L4}{D} < 2 \quad \frac{L5}{D} > 1$$

$$50 > \frac{S_D}{Si} > 6$$

where $S_D$ = the cross-section corresponding to diameter D, and $Si$ = the sum of the intake cross-sections.

In a preferred embodiment, the ratios are the following:

$$\frac{Do}{D} = 0.4375 \quad \frac{Di}{D} = 0.175 \quad \frac{L1}{D} = 0.4 \quad \frac{L2}{D} = 4.87$$

$$\frac{Ds}{D} = 0.19 \quad \frac{Dp}{D} = 0.034 \quad \frac{Du}{D} = 0.28 \quad \frac{L3}{D} = 15$$

-continued
$$\frac{L4}{D} = 0.3$$

The hydrocyclone according to the invention has the advantage of allowing the separation, firstly, of solid matter with density greater than that of water, then the separation of the hydrocarbons from the water. The use of this type of hydrocyclone makes it possible to eliminate a stage of pre-treatment of the effluent as used in separators of the Lakos type, and to do this without thereby increasing the bulk of the hydrocyclone.

This type of hydrocyclone finds its application in the treatment of waste water, in the treatment of water with a view to its reinjection and in the treatment of refinery or petrochemicals water.

The hydrocyclone according to the invention may comprise a single intake 22 or a plurality of similar intakes arranged tangentially and uniformly distributed over the periphery of the cylindrical part 12. The cylindrical endpiece forming the outlet 16 may be in the shape of a converging cone or a diverging cone.

We claim:
1. Three-phase cyclone separator for separating a mixture or an emulsion into a low density phase, a high density phase and an intermediate density phase, comprising a body formed by a cylindrical part extended at one of its ends by a converging, substantially conical part, at least one intake mounted tangentially on the cylindrical part and a substantially tubular element mounted on the body and communicating hydraulically therewith, wherein the substantially tubular element is mounted on an annular element closing the end of the cylindrical part opposite the substantially conical part, the substantially tubular element projecting into the body beyond the annular element, and the substantially conical part is fitted, towards its apex, with a first outlet for said low density phase and a second outlet for said high density phase and the substantially tubular element defines, at its end opposite to said body, a third outlet for said intermediate density phase and wherein the substantially tubular element, the body and the three outlets are arranged coaxially.

2. Separator according to claim 1, wherein the substantially tubular element is formed by a part of low conicity and by a cylindrical extension.

3. Separator according to claim 1, wherein the second outlet is formed by a cylindrical endpiece, the first outlet comprising a tube arranged inside the endpiece.

4. Separator according to claim 1, wherein it comprises two intakes mounted tangentially on the cylindrical part, diametrically opposite each other.

* * * * *